(12) United States Patent
Soderqvist

(10) Patent No.: US 12,305,681 B2
(45) Date of Patent: May 20, 2025

(54) SPACE SAVING MECHANISM FOR INSTALLATION OF SWING DOOR OPERATOR

(71) Applicant: Assa Abloy Entrance Systems AB, Landskrona (SE)

(72) Inventor: Sven-Gunner Soderqvist, Vallakra (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 274 days.

(21) Appl. No.: 17/056,531

(22) PCT Filed: Jun. 12, 2019

(86) PCT No.: PCT/EP2019/065270
§ 371 (c)(1),
(2) Date: Nov. 18, 2020

(87) PCT Pub. No.: WO2019/238717
PCT Pub. Date: Dec. 19, 2019

(65) Prior Publication Data
US 2021/0214983 A1    Jul. 15, 2021

(30) Foreign Application Priority Data
Jun. 13, 2018   (SE) .................................. 1830189-5

(51) Int. Cl.
*F16B 2/12*   (2006.01)
*E05D 5/02*   (2006.01)
(Continued)

(52) U.S. Cl.
CPC .............. *F16B 2/12* (2013.01); *E05D 5/0238* (2013.01); *E05F 1/00* (2013.01); *E05F 3/227* (2013.01);
(Continued)

(58) Field of Classification Search
CPC .... F16B 2/12; F16B 2/065; F16B 2/06; F16L 3/24; F16L 3/243
(Continued)

(56) References Cited

U.S. PATENT DOCUMENTS 729,445 A * 5/1903 Streeter ..................... E04B 9/16
403/387
1,363,321 A    12/1920 Jaeger
(Continued)

FOREIGN PATENT DOCUMENTS

EP    2738335    6/2014
EP    2754816    7/2014
(Continued)

OTHER PUBLICATIONS

International Search Report and Written Opinion in PCT/EP2019/065270, mailed Sep. 27, 2019.
(Continued)

*Primary Examiner* — Christopher Garft
(74) *Attorney, Agent, or Firm* — Wissing Miller LLP

(57) ABSTRACT

A clamp (1) for attaching a component (3) to a back plate (2), said clamp (1) comprises two clamp members (11, 12), the clamp members (11, 12) being connected by a fastener (13) configured to apply a force at least in a direction which brings the clamp members (11, 12) closer together, and wherein each clamp member (11, 12) is configured to cooperate with a retaining shoulder (31) of the component (3).

10 Claims, 3 Drawing Sheets

(51) Int. Cl.
  *E05F 1/00* (2006.01)
  *E05F 3/22* (2006.01)
(52) U.S. Cl.
  CPC ... *E05Y 2600/502* (2013.01); *E05Y 2600/626* (2013.01); *E05Y 2600/63* (2013.01)
(58) Field of Classification Search
  USPC ......... 248/222.12, 223.41, 279–282, 229.12, 248/228.3, 229.22; 269/160, 218, 95
  See application file for complete search history.

(56) References Cited

U.S. PATENT DOCUMENTS

| | | | | |
|---|---|---|---|---|
| 2,564,138 | A * | 8/1951 | Walker | B25B 1/24 |
| | | | | 269/95 |
| 3,243,153 | A * | 3/1966 | Kelly | B64D 1/06 |
| | | | | 248/223.41 |
| 6,119,317 | A * | 9/2000 | Pfister | F16M 11/24 |
| | | | | 24/514 |
| 7,456,361 | B2 * | 11/2008 | Hill | H01R 4/646 |
| | | | | 248/74.2 |
| 8,366,340 | B2 * | 2/2013 | Munakata | F16B 37/045 |
| | | | | 403/231 |
| 10,612,573 | B2 * | 4/2020 | Recker | F16B 2/12 |
| 2006/0137287 | A1 | 6/2006 | Svendsen | |
| 2009/0146124 | A1 * | 6/2009 | Carney | E04F 11/1846 |
| | | | | 256/68 |
| 2011/0315840 | A1 * | 12/2011 | Connolly | F16M 13/022 |
| | | | | 248/220.31 |
| 2012/0286110 | A1 * | 11/2012 | Hill | F16L 3/26 |
| | | | | 248/74.2 |
| 2013/0047486 | A1 * | 2/2013 | Ding | F16B 2/12 |
| | | | | 403/381 |

FOREIGN PATENT DOCUMENTS

| | | |
|---|---|---|
| GB | 1384691 | 2/1975 |
| GB | 1396376 | 6/1975 |
| GB | 2002446 | 2/1979 |
| JP | 2009140900 | 6/2009 |
| JP | 2012189128 | 10/2012 |
| WO | 2011157326 | 12/2011 |
| WO | 2013078533 | 6/2013 |

OTHER PUBLICATIONS

Swedish Search Report in Swedish Pat. Appl. No. 1830189-5, mailed Nov. 23, 2018.
European Office Action for EP Application No. 19731907.2, dated Jun. 6, 2023.
European Office Action for EP Application No. 19731907.2, dated Jun. 27, 2022.

* cited by examiner

SPACE SAVING MECHANISM FOR INSTALLATION OF SWING DOOR OPERATOR

This application is a 371 of PCT/EP2019/065270 filed on Jun. 12, 2019, published on Dec. 19, 2019 under publication number WO 2019/238717, which claims priority benefits from Swedish Patent Application No. 1830189-5, filed on Jun. 13, 2018, the disclosure of which is incorporated herein by reference.

TECHNICAL FIELD

The present invention relates to the technical field of door operator assemblies and interfaces for attaching components to a wall.

BACKGROUND

Door operator assemblies are today common items in office buildings, shopping centres etc. for providing automated opening of various types of doors. Often are the door operator assemblies mounted to a fixed structure, such as a wall, and then connected to the door via some sort of linkage.

It is also a regularly occurring technique to use some sort of back plate, or bracket, which is attached firstly to the fixed structure. The back plate then serves as an interface onto which the remaining components are attached. This gives several benefits in the mounting of the door operator assembly. One such benefit being that the components of the door operator assembly may be attached and removed in a manner that is less tedious than attaching them directly to the wall. This also allows components to be replaced more easily, which is desirable given that many door operator assemblies are modular to allow that components to be replaced for instance for upgrading or in case of malfunction.

As the available room for mounting the door operator assembly to a door may be limited, manufacturers of door operator assemblies continuously strive to reduce the size of the operator assemblies in whole and the operators themselves. One problem when reducing the size of the operator and how far the back plate and operator protrudes from the wall is that it may make the attachment of each component to the back plate more difficult, as accessibility may be somewhat compromised due to the overall decrease in size.

It is therefore desired to provide a way of mounting a door operator assembly to a wall that is easy, allows the size of the door operator assembly to be reduced while simultaneously reducing or at least maintaining the time required for mounting the entire door operator assembly to the wall. It is also desired to provide means for attaching components to the back plate that is strong while using small amounts material, keeping production costs down without compromising structural integrity.

SUMMARY

It is therefore an object of the invention to at least partly overcome one or more of the above-identified limitations of the prior art. In particular, it is an object to provide a clamp for attaching a component to back plate, a component comprising a retaining shoulder for cooperation with the clamp, a back plate, a door operator assembly and a method for attaching components to a back plate.

In a first aspect of the invention is a clamp provided for attaching a component to a back plate. The clamp comprises two clamp members, the clamp members being connected by a fastener configured to apply a force at least in a direction that brings the clamp members closer together. Each clamp member is configured to cooperate with a retaining shoulder of the component such that movement of the clamp members towards each other also moves each clamp member into contact with a respective surface of the back plate securing the component to the back plate. The clamp provides a quick and easy way of securing a component to a back plate. The clamp requires little space on the back plate for securing the component, allowing the size of the entire door operator assembly to be reduced.

The clamp may further comprise a resilient member configured provide a biasing force pushing the clamp members away from each other, facilitating mounting of the clamp to the back plate. The clamp members may be pushed towards each other against the biasing force of the resilient member, and then arranged against the back plate. When the clamp members are subsequently released, the resilient member will bring the clamp members apart to the distance defined by the fastener or by contact with the back plate, and in the latter case will the interaction of the clamp and the back plate hold the clamp loosely in place on the back plate.

In an embodiment, each clamp member comprises a retaining lip arranged distally on each clamp member. The retaining lip being configured to cooperate with the respective surface in the back plate. The retaining lip secures the clamp and the component to the back plate by its contact with the surface on the back plate.

Each clamp member may further comprise a inclined surface configured to face the retaining shoulder and to cooperate with the retaining shoulder of the component. When the fastener is tightened so that the clamp members starts moving closer together over the retaining shoulder, the inclined surface will cause the simultaneous motion of the clamp away from the front surface of the back plate and bring the clamp into contact with the surface of the back plate.

The inclined surface may extend from a heel arranged proximally of the retaining lip on each clamp member and is inclined away from the back plate in a proximal direction towards the center of the clamp.

In one embodiment, the clamp comprises rounded edges surrounding the retaining lip and the inclined surface. The rounded edges prevent unnecessary high contact stresses from occurring during the fixing of the component to the back plate.

The fastener may be a screw arranged with the screw head at the first clamp member and in threaded engagement at a second end with the second clamp member. The screw may further be angled in relation to the back plate such that the center of the screw head is configured to be arranged further away from the back plate than the center of the second end. This facilitates access to the screw, as the screw head is positioned slightly further away from the back plate. The angle of the screw allows the tool that is used to also be angled slightly outwards from the wall, also contributing to making the clamp easier to attach to the back plate. Further in the field of entrance systems it is usually preferred to mount the component from below since thereby usage of a ladder may be avoided. Thus, the inclined orientation allows for mounting from below while avoiding a protruding door casing getting in the way.

In a second aspect is a component provided, the component being configured to be attached to a back plate by means of a clamp of the first aspect. The component further comprises at least one retaining shoulder on a side of the component configured to face in the longitudinal direction of the back plate. A distal portion of the retaining shoulder is configured to fit between and cooperate with the clamp members of the clamp to secure the component to the back plate. The retaining shoulder provides a strong connection of the component to the back plate.

The retaining shoulder may comprise a inclined surface configured to face the clamp on each side of the distal portion. The inclined surfaces being configured to cooperate with the inclined surfaces on the clamp members. The inclined surfaces on the retaining shoulder and the clamp form a sliding interface between the components.

Further still, the edges surrounding the inclined surfaces on the retaining shoulder may be rounded reducing contact stresses between the clamp and the retaining shoulder.

In a third aspect is a back plate provided. The back plate being configured to form an interface for attaching components to a wall. The back plate comprises a rear side intended to face the wall and a front side opposite the rear side. At least one component is mountable to the front side by means of at least one clamp and at least one retaining shoulder arranged on the at least one component. The back plate comprises surfaces facing the front side and extending longitudinally along at least a portion of the back plate, and the clamp is configured come into contact with the surfaces to secure the component to the back plate.

The back plate may further comprise a longitudinal wall arranged one each side of the back plate, the walls each being provided with a groove on the side of each wall facing the other wall. The grooves extends longitudinally along at least a portion of the back plate and being arranged on each side of the front side. The surfaces are formed by an upper surface in the grooves. The grooves guides the clamp during the placement of it in relation to the retaining shoulder of the component, as well as provides a strong upper surface against which the clamp is pressed when the component is secured to the back plate.

In a fourth aspect is a door operator assembly provided comprising at least one clamp of the first aspect, a back plate of the second aspect, at least one component comprising at least one retaining shoulder of the third aspect. The at least one clamp secures the component to the back plate. The door operator assembly is thus made easier to assemble and easier to mount to a wall. The size of the operator assembly may be reduced as the clamp and retaining shoulder does not need to rest on a bottom flange of the back-plate, while also not compromising with the strength of the wall attachment. With such a door operator assembly the size of the back-plate may be reduced significantly. Thereby it is also possible to achieve a door operator assembly which protrudes from the wall. As the door operator assembly is quick to assemble are there also benefits in costs, as the man hours required both during installation as well during different types of maintenance operations can be reduced. Furthermore, the versatility of the door operator assembly is improved allowing it to be fitted to doors where regular door operator assemblies will not fit or where for instance door casings are in the way. Also, the back-plate allows for components to be fitted freely in relation to the wall, enabling further flexibility.

In a fifth aspect is a method provided for attaching a component comprising at least one retaining shoulder of the second aspect, to a back plate of the third aspect by means of at least one clamp of the first aspect. The method comprises the steps of: arranging the at least one component in its desired position against the front side of the back plate, placing the at least one clamp over the at least one retaining shoulder, and securing the at least one component to the back plate by use of the fastener.

In one embodiment, the step of placing further comprises moving the clamp members towards each other against the biasing force of the resilient member, and releasing the clamp members such that the respective retaining lip on each clamp member is arranged in a respective groove and thereafter sliding the at least one clamp over the at least one retaining shoulder. The resilient member keeps the clamp loosely attached to the back plate by the interaction between the retaining lips and the respective grooves. This is beneficial as the clamp can simple be placed on the back plate adjacent to the retaining shoulder of the component and it will be kept in place without having to secure it using a tool. Then it is moved, guided by the grooves, over the retaining shoulder and then secured by use of the fastener. The time it takes for mounting or removing each component from the back plate can thus be reduced.

Embodiments of the invention are defined by the appended dependent claims and are further explained in the detailed description section as well as in the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly state

BRIEF DESCRIPTION OF THE DRAWINGS

The present invention will be described further below by way of example and with reference to the enclosed drawings. In the drawings.

DETAILED DESCRIPTION OF EMBODIMENTS

Figure 1:
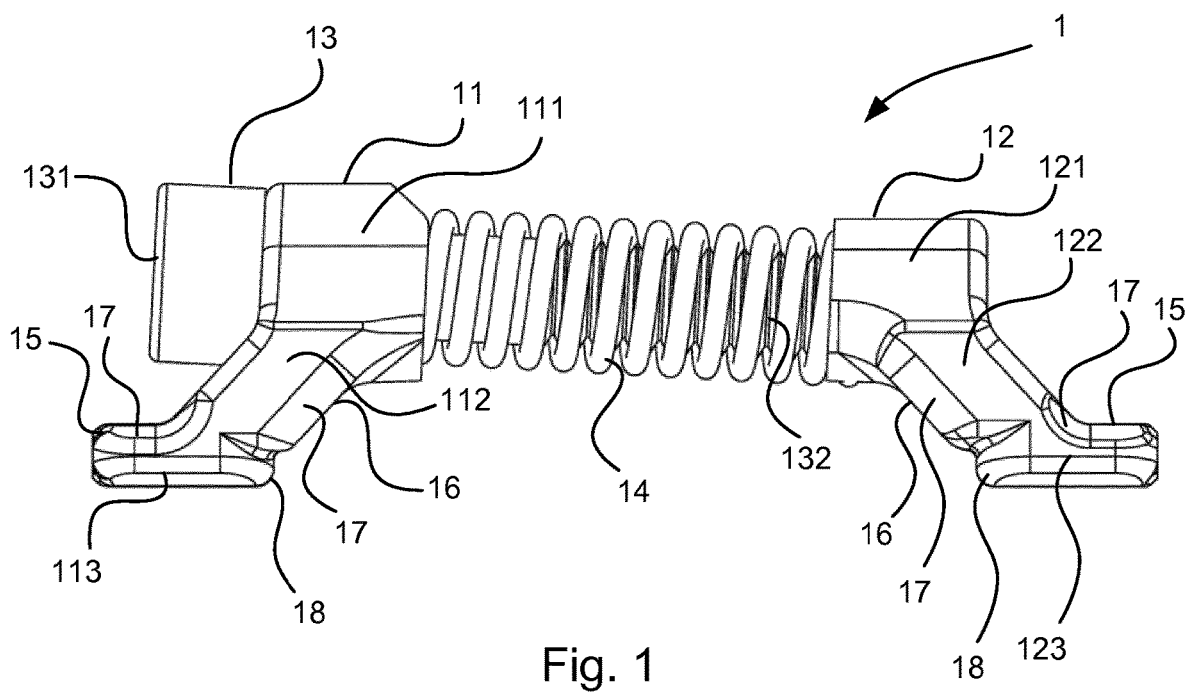
FIG. 1 shows a side view of a clamp according to one embodiment.

Embodiments of the invention will now be described with reference to the accompanying drawings. The invention may, however, be embodied in many different forms and should not be construed as limited to the embodiments set forth herein;

rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements. First will the details of the ingoing parts of the door operator assembly 100 be explained in relation to FIGS. 1 to 3, and then their mutual relationship in relation to FIGS. 4 and 5.

FIG. 1 shows a clamp 1 that is to be used to attach a component 3, preferably a component 3 of a door operator assembly such as a door operator, to a back plate 2. The clamp 1 comprises a first clamp member 11 and a second clamp member 12. The clamp members 11, 12 are connected by a fastener 13 here shown in the form of a screw. Other fasteners are also considered such as lever arm type fasteners etc. The clamp 1 is preferably made out of a metallic material such as aluminum or an alloy such as steel, however polymeric materials and composite materials are also considered. In one embodiment the clamp members 11, 12 may be manufactured in one material and the fastener 13 in another material.

The door operator assembly is preferably for causing movements of one or more movable door members of an entrance system between a closed and open position. The entrance system may for example be a swing door system, a sliding door system or a high speed door system. A transmission mechanism conveys mechanical power from the door operator 30 to the movable door members.

The clamp members 11, 12 constitutes the part of the clamp 1 that is configured to contact the back plate 2 as well as the retaining shoulder 31 (shown in FIG. 2) and to secure these together. The retaining shoulder 31 is in turn mounted to a component 3, either integrally or as a removable part. Each clamp member 11, 12 is shaped such that an upper portion 111, 121 comprises a hole for receiving the fastener 13. The holes may be through holes in both clamp members 11, 12 or only in the first clamp member 11. At least one of the holes for receiving the fastener 13 is threaded, preferably the hole in the second clamp member 12. Preferably is the first clamp member 11 free to move axially and rotationally on the fastener 13, the axial movement being limited by a screw head 131 of the fastener 13.

The clamp members 11, 12 further comprises a lower portion 113, 123 that is connected to the upper portion 111, 121 by an inclined intermediate portion 112, 122. The lower portion 113, 123 is by the inclination of the intermediate portion 112, 122 arranged distally or laterally of the upper portion 111, 121, i.e. further away from the center of the clamp 1. Each lower portion 113, 123 on each clamp member 11, 12 further comprises a retaining lip 15 arranged outer most or distally on the clamp 1. In other words, the retaining lips 15 form two lateral protrusions on the lower portions 113, 123 of the clamp 1. On the opposite side of the retaining lip 15 on each lower portion 113, 123 is a heel 18 arranged, forming the transition from the underside of the lower portion 113, 123 to the inclined intermediate portion 112, 122. An inclined surface 16 is arranged on the intermediate portion 112, 122 extending from the heel 18 to the upper portion, thus facing the retaining shoulder 31 and the front surface 24 of the back plate 2. The inclined surface 16 being arranged on the side of the intermediate portion 112, 122 facing downwards and against the other clamp member 11, 12.

The fastener 13, preferably being a screw 13, comprises a screw head 131 arranged at the first clamp member 11 and a threaded second end 132 interacting with the threaded hole in the second clamp member 12. In this way, the rotation of the fastener 13 controls the distance between the first and second clamp members 11, 12. A resilient member 14 may be provided surrounding the fastener 13. The resilient member 14 may be a coil spring or any other type of spring that is suitable for providing a biasing force pushing the clamp members 11, 12 away from each other. The resilient member 14 will keep the first clamp member 11 pushed against the screw head 131 as long as no external force is applied to the clamp members 11, 12 that overcomes the biasing force of the resilient member 14.

Furthermore, the edges 17 surrounding the retaining lip 15 and the inclined surface 16 on each clamp member 11, 12 is preferably rounded. This is beneficial as the retaining lip 15 and the inclined surface 15 serve as contact surfaces and the rounded edges 17 prevents that high contact stresses form in the adjacent component(s), i.e. the retaining shoulder 31 and the back plate 2.

As is also evident from FIG. 1, the fastener 13 may be arranged at an angle through the clamp member 11, 12. Preferably is the distance between the center of the screw head 131 to the underside of the lower portion 113 on the first clamp member 11 longer than the distance between the center of the second end 132 to the underside of the lower portion 123 of the second clamp member 12. The inclination of the fastener 13 simplifies access to the screw head 131, as will be explained further in relation FIG. 4.

Figure 2:
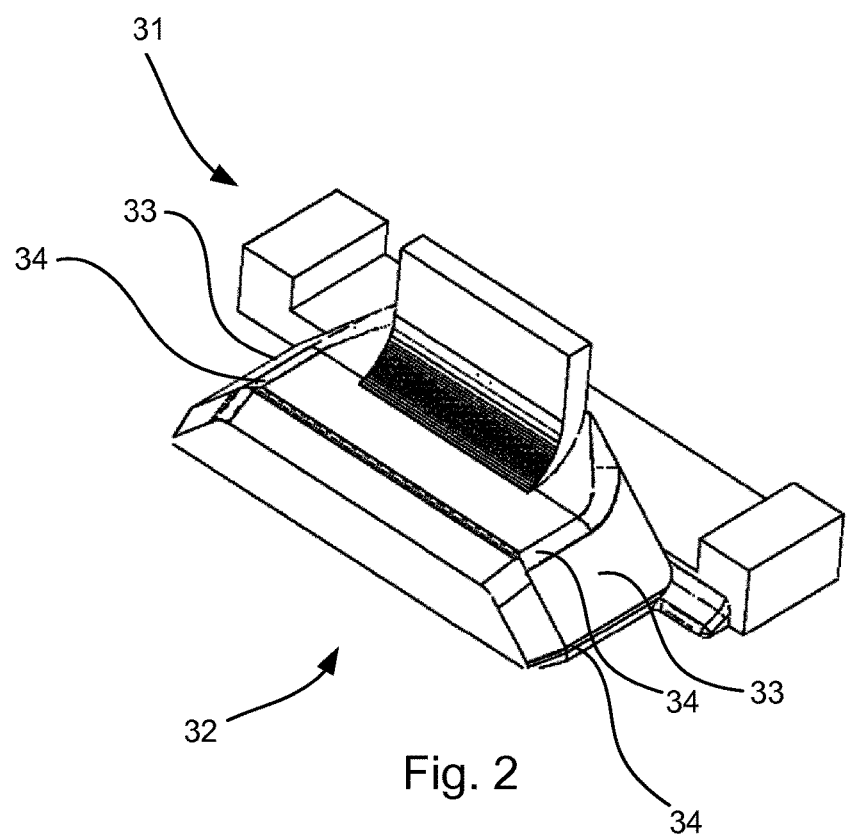
FIG. 2 shows a perspective view of a retaining shoulder according to one embodiment.

Turning to FIG. 2 in which a retaining shoulder 31 is shown. The retaining shoulder 31 is preferably made out of a metallic material or an alloy such as steel or aluminum, however polymeric materials and composite materials are also considered.

Figure 4:
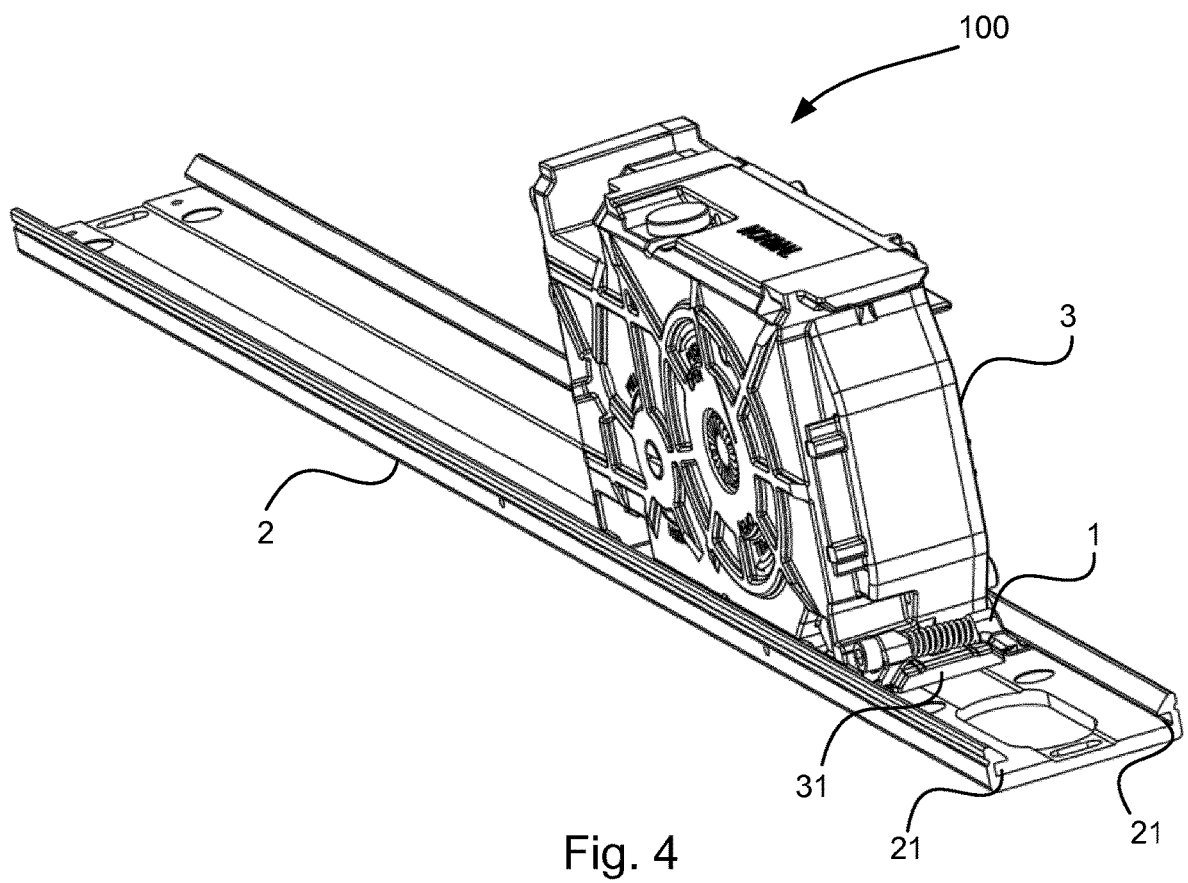
FIG. 4 shows a perspective view of a door operator assembly according to one embodiment.

The retaining shoulder 31 is configured to be attached integrally or as a removable part to a component 3 (shown in FIG. 4). The retaining shoulder 31 is configured to cooperate with the clamp 1 in securing the component 3 to the back plate 2. The retaining shoulder 31 is configured to be arranged on the sides of each component 3 facing in the longitudinal direction of the back plate 2. The retaining shoulder 31 comprises a distal portion 32 that is configured to be arranged between the clamp members 11, 12.

On each side, i.e. the sides facing essentially perpendicularly to the longitudinal direction of the back plate 2, of the distal portion 32 is an inclined surface 33 arranged facing the clamp 1, or more specifically the inclined surfaces 16 on the clamp members 11, 12. The surfaces 33 are oppositely arranged facing away from each other. The inclinations of the surfaces 33 are preferably such that they essentially match the inclination of the respective inclined surface 16 on the clamp members 11, 12. As with the edges 17 on the clamp 1, the edges 34 surrounding the inclined surfaces 33 on the retaining shoulder 31 are preferably also rounded.

Figure 3:
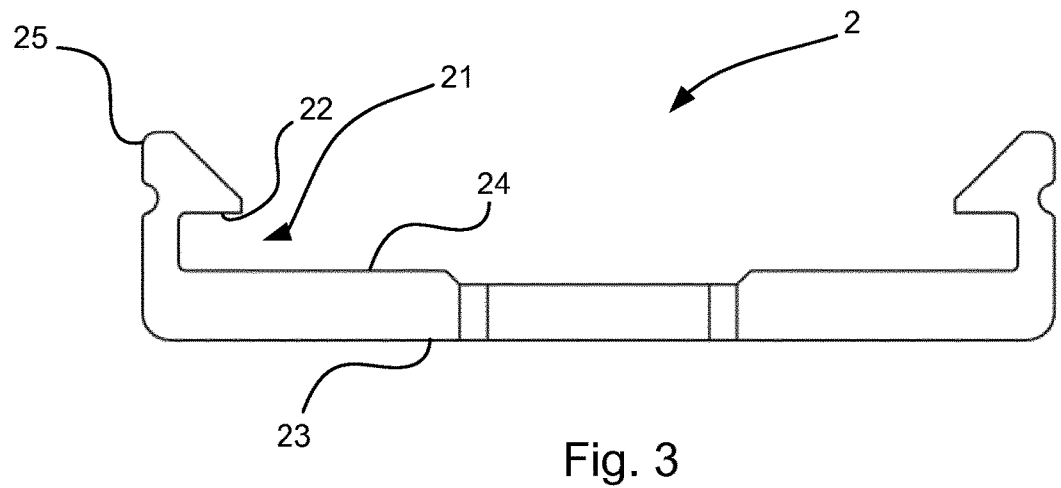
FIG. 3 shows the profile of a back plate according to one embodiment.

In FIG. 3 is a back plate 2 shown in a view in the longitudinal direction of the back plate 2. The back plate 2 may be an elongated bracket profile, preferably made out of a metallic material such as aluminum or an alloy such as steel, however polymeric materials and composite materials are also considered.

The back plate 2, which forms an interface for connecting components 3 of a door operator assembly 100 to a wall, comprises a rear side 23 intended to face the wall or another similar fixed structure. Opposite of the rear side 23 is a front side 24 arranged, onto which the components 3 are mountable. On each side of the back plate 2 is a wall 25 arranged protruding upwards from the front side 24. The walls 25 extending in the longitudinal direction and along at least a part of the length of the back plate 2, giving the back plate 2 an essentially C-shaped cross-section. The inner side on each wall 25 is provided with a groove 21 also extending along at least a part of the length of the back plate 2. The grooves 21 are configured to cooperate with the retaining lips 15 on the clamp 1. A surface 22 in each groove 21 is arranged facing downwards against the front side 24 of the back plate 2, this surface 22 forms an upper restriction for movement of the clamp 1 during its cooperation with the retaining shoulder 31 of the component 3. The surfaces 22 thus essentially forms flanges on the back plate 2. This is critical as when the clamp 1 is placed over a retaining shoulder 31 and the fastener 13 is tightened such that the clamp members 11, 12 are moved closer together, the clamp 1 will move upwards (i.e. away from the front surface 24 of the back plate 2) on the retaining shoulder 31 and eventually make contact with the surface 22. This interaction mechanism will lock the component 3 to the back plate 2. More specifically, the interaction of the inclined surfaces 16 on the clamp 1 and the inclined surfaces 33 on the retaining shoulder 31 provides the upwardly motion of the clamp 1 in relation to the retaining shoulder 31 when the fastener 13 is tightened and the clamp members 11, 12 moves towards each other.

FIG. 4 shows the cooperation of the clamp 1, the retaining shoulder 31 on the component 3 and the back plate 2. The component 3 shown here in the form of a door operator 3, but it could also be any other component 3 of the door operator assembly 100. Each component 3 may comprise one or more retaining shoulders 31, depending on the application. Preferably is one retaining shoulder 31 arranged on each side of the component that faces in the longitudinal direction of the back plate 2.

Figure 5:
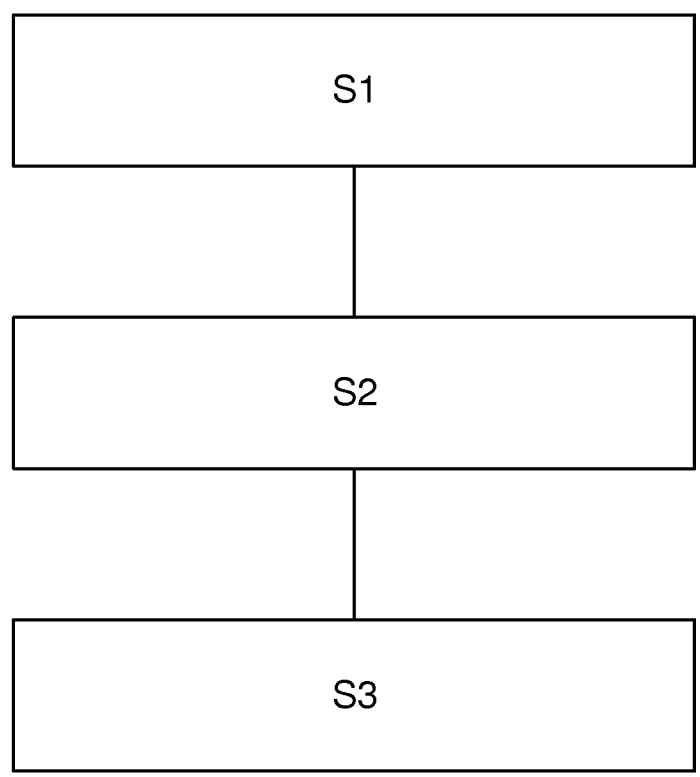
FIG. 5 shows a flow chart of a method for attaching component to a back plate according to one embodiment.

FIG. 5 shows a block diagram of a method for attaching a component 3 to the back plate 2 using a clamp 1. Firstly is the component 3 arranged S1 in its desired position against the front side 24 of the back plate 2. It is to be noted that the process of mounting components 3 to the back plate 2 may be performed after that the back plate 2 is attached to the wall as well as before. The actual attachment of the back plate 2 to the wall may be performed in a number of ways, and is not considered relevant to the invention.

After that the component 3 has been positioned on the back plate 2 can a clamp 1 be placed S2 over each retaining shoulder 31 on the component 3. The positioning of the clamp 1 on the back plate 2 is facilitated in that the clamp members 11, 12 may be brought closer together before the clamp 1 is placed S2 on the back plate 2. After that the clamp 1 is positioned against the front side 24 may the clamp members 11, 12 be brought further apart again which places the retaining lips 15 in the grooves 21 in the back plate 2. This is especially convenient if the clamp 1 comprises the resilient member 13, as this will provide a biasing force holding the clamp 1 loosely in place on the back plate 2. The clamp 1 can thereafter simply be moved over the retaining shoulder 31 of the component 3, as the interaction between the grooves 21 and the retaining lips 15 will guide the motion of the clamp 1 and make sure that the retaining shoulder 31 fits between the clamp members 11, 12. What is of importance is that the clamp 1 is placed over the retaining shoulder 31 of the component 3, naturally may also the clamp 1 be placed first in a desired position with the component 3 then being moved such that the retaining shoulder 31 is placed between the clamp members 11, 12.

After that the retaining shoulder 31 and the clamp 1 are positioned correctly in relationship to one another may the component 3 be secured S3 to the back plate 2. This is achieved by means of the fastener 13, as turning this causes the clamp member 11, 12 to move closer together causing a simultaneous upwardly (i.e. in a direction away from the front surface 24 of the back plate 2) motion of the clamp 1 by its contact with the retaining shoulder 31. The retaining lips 15 will then make contact with the surface 22 in the grooves 21 of the back plate 2, and the interaction between the surface 22, the retaining lips 15 and the inclined surfaces 16, 33 on the clamp 1 and retaining shoulder 31 respectively will secure the component 3 to the back plate 2.

As it may sometimes difficult to access the fastener 13 with tools, the fastener 13 can be arranged at angle in the clamp 1 as mentioned above. The screw head 131 is thus arranged slightly higher than the second end 132 of the fastener 13, and is also angled slightly upwards. This will facilitate access to the clamp 1 with tools, and allow the door operator assembly 100 to be placed for instance directly over a door casing without risking that this obstructs the access to the fastener 13.

It should be mentioned that the inventive concept is by no means limited to the embodiments described herein, and several modifications are feasible without departing from the scope of the appended claims. In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A system for attaching a component to a back plate, comprising:
    two clamp members forming a clamp, the clamp members being connected by a fastener configured to apply a force at least in a first direction which brings the clamp members closer together, wherein the fastener comprises a head portion accessible from outside of the clamp to facilitate actuation of the fastener to apply the force, and wherein each clamp member comprises an inclined surface and a retaining lip;
    a resilient member configured to provide a biasing force in a second direction pushing the clamp members and retaining lips away from each other,
    at least one retaining shoulder arranged on the component; and
    at least one retaining surface and a front face arranged on the back plate, wherein the at least one retaining surface faces toward the front face and wherein the at least one retaining surface defines at least one groove,
    wherein the retaining lip is positioned in the groove between the front face and the at least one retaining surface,
    wherein the biasing force in the second direction moves clamp members apart and moves the retaining lip away from one another and into engagement with the groove to loosely hold the clamp to the back plate,
    wherein the inclined surface cooperates with the at least one retaining shoulder such that movement of the clamp members towards each other moves the inclined surface of at least one of the clamp members in the first direction opposite from the second direction into contact with and along the respective retaining shoulder, and
    wherein the motion of the respective inclined surface along the at least one retaining shoulder moves the retaining lip toward the retaining surface of the back plate securing the component to the back plate.

2. The system according to claim 1, wherein the inclined surface extends from a heel arranged proximally of the retaining lip on each clamp member and is inclined away from the back plate in a proximal direction towards a center of the clamp.

3. The system according to claim 1, wherein edges surrounding the retaining lip and the inclined surface are rounded.

4. The system according to claim 1, wherein the fastener is a screw, wherein the head portion comprises a screw head in contact with a first clamp member, wherein the screw comprises a threaded portion in threaded engagement with a second clamp member, and wherein the screw is angled in relation to the back plate such that a center of the screw head is configured to be arranged further away from said back plate than a center of the second end.

5. The component configured to be attached to a back plate by means of the system according to claim 1, wherein the at least one retaining shoulder is disposed on a side of the component to face in a longitudinal direction of the back plate, and wherein a distal portion of the at least one retaining shoulder is configured to fit between and cooperate with the clamp members of the clamp to secure the component to the back plate.

6. The component according to claim 5, wherein the at least one retaining shoulder comprises a further inclined surface configured to face the clamp on each side of the distal portion, said further inclined surface of the at least one retaining shoulder being configured to cooperate with the inclined surfaces on the clamp members.

7. The component according to claim 5, further comprising edges surrounding the inclined surfaces of each of the clamp members and wherein the edges are rounded.

8. A back plate system configured to form an interface for attaching a component to a wall, comprising:
- a back plate, wherein said back plate comprises a rear side intended to face the wall, a front side opposite the rear side, two longitudinal walls arranged along respective longitudinal edges of the back plate, and two retaining surfaces extending from respective ones of the walls to define two longitudinal grooves along edges of the back plate;
- at least one clamp comprising two clamp members and a fastener, wherein the fastener comprises a head portion accessible from outside of the at least one clamp to facilitate rotation of the fastener, wherein the component is mountable to the back plate by means of the at least one clamp and wherein the clamp members each comprise a retaining lip and an inclined surface, and wherein rotation of the fastener moves the two clamp members in a first direction toward one another,
- a biasing mechanism adapted to bias the retaining lips of the clamp members along a second direction away from one another into engagement with the one or more grooves, to loosely hold the clamp to the back plate, and
- at least one retaining shoulder arranged on the component, wherein, when the force in the first direction is applied by the fastener at least one of the inclined surfaces is displaced along the at least one retaining shoulder to move at least one of the retaining lips against at least one of the retaining surfaces to secure the component to the back plate.

9. The system according to claim 1, wherein the clamp members are adapted to be pushed toward one another against the bias force to arrange the retaining lips in the one or more grooves.

10. The system according to claim 1, wherein the fastener comprises a screw in threaded engagement with the clamp members and wherein rotation of the screw moves the clamp members toward one another to secure the component to the back plate.

* * * * *